(12) United States Patent
Takato et al.

(10) Patent No.: US 6,989,880 B2
(45) Date of Patent: Jan. 24, 2006

(54) LIQUID CRYSTAL DISPLAY DEVICE

(75) Inventors: Kohki Takato, Kanagawa-ken (JP);
Seiichi Nakamura, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/194,014

(22) Filed: Jul. 15, 2002

(65) Prior Publication Data

US 2002/0180922 A1    Dec. 5, 2002

Related U.S. Application Data

(62) Division of application No. 09/750,697, filed on Jan. 2, 2001, now Pat. No. 6,445,434.

(30) Foreign Application Priority Data

Jan. 11, 2000   (JP)   ............... 2000-006073
Dec. 12, 2000   (JP)   ............... 2000-376914

(51) Int. Cl.
    *G02F 1/1337*   (2006.01)
(52) U.S. Cl. .................. 349/129; 349/124; 349/128
(58) Field of Classification Search ................ 349/123, 349/128, 129, 124, 125; 359/75
    See application file for complete search history.

(56) References Cited

U.S. PATENT DOCUMENTS

| | | | |
|---|---|---|---|
| 4,002,404 A * | 1/1977 | Dir | 349/129 |
| 5,850,274 A | 12/1998 | Shin et al. | |
| 5,936,596 A | 8/1999 | Yoshida et al. | |
| 6,081,311 A | 6/2000 | Murai | |
| 6,115,087 A * | 9/2000 | Ohi | 349/38 |
| 6,236,443 B1 * | 5/2001 | Carlsen | 349/143 |
| 6,466,288 B1 * | 10/2002 | Rho | 349/141 |
| 6,515,728 B1 * | 2/2003 | Song et al. | 349/148 |
| 6,692,657 B1 * | 2/2004 | Kato et al. | 252/299.63 |

FOREIGN PATENT DOCUMENTS

| | | |
|---|---|---|
| DE | 199 25 985 A1 | 12/2000 |
| EP | 0 408 036 | 1/1991 |
| EP | 0 549 283 A2 | 6/1993 |
| EP | 0 636 919 A1 | 2/1995 |
| EP | 0 908 757 | 4/1999 |
| EP | 1 154 307 A1 | 11/2001 |
| JP | 62-65580 | 3/1987 |
| JP | 07199143 | 8/1995 |
| NL | 1006054 | 7/1998 |

* cited by examiner

*Primary Examiner*—Robert Kim
*Assistant Examiner*—Hoan Chau Nguyen
(74) *Attorney, Agent, or Firm*—Oblon, Spivak, McClelland, Maier & Neustadt, P.C.

(57) ABSTRACT

A liquid crystal display device including a liquid crystal layer, an alignment layer orientating the liquid crystal layer, and a driving circuit that drives the liquid crystal layer. The alignment layer is divided into a plurality of specified regions, each having a recognizable size. The orientation direction of adjacent regions is different from one another. This makes it difficult to resolve a displayed image from directions other than that from the front of the display, and instead a fixed pattern is seen when the display is viewed from directions other than that from the front. This fixed pattern can be chosen as desired and can be, e.g., a figure or a trade name of a product.

7 Claims, 19 Drawing Sheets

MAXIMUM VISIBLE ANGLE IN EACH DIRECTION (degrees)

| | | ① | ② | ③ | ④ | ⑤ | ⑥ | ⑦ | ⑧ |
|---|---|---|---|---|---|---|---|---|---|
| 1st Embodiment | Figure | 16 | 18 | 32 | 17 | 16 | 18 | 32 | 19 |
| | Character | 15 | 18 | 30 | 18 | 15 | 18 | 30 | 18 |
| 2nd Embodiment | Figure | 16 | 18 | 30 | 17 | 15 | 16 | 25 | 16 |
| | Character | 12 | 15 | 24 | 15 | 12 | 15 | 25 | 14 |
| 3rd Embodiment | Figure | 11 | 14 | 24 | 14 | 14 | 12 | 25 | 13 |
| | Character | 10 | 13 | 22 | 13 | 10 | 12 | 23 | 12 |
| 4th Embodiment | Figure | 15 | 33 | 50 | 34 | 14 | 33 | 50 | 34 |
| | Character | 15 | 35 | 50 | 35 | 15 | 33 | 52 | 36 |
| Comparison Ex. 1 | Figure | 45 | 22 | 31 | 19 | 15 | 18 | 30 | 18 |
| | Character | 40 | 20 | 30 | 18 | 15 | 19 | 33 | 19 |
| Comparison Ex. 2 | Figure | 23 | 18 | 22 | 14 | 11 | 12 | 25 | 13 |
| | Character | 24 | 18 | 22 | 13 | 10 | 12 | 23 | 12 |
| Comparison Ex. 3 | Figure | 70 | 45 | 53 | 38 | 10 | 30 | 51 | 35 |
| | Character | 70 | 45 | 55 | 36 | 18 | 33 | 49 | 37 |
| Comparison Ex. 4 | Figure | 25 | 29 | 40 | 28 | 25 | 25 | 33 | 25 |
| | Character | 22 | 23 | 33 | 24 | 22 | 25 | 36 | 25 |

LIQUID CRYSTAL DISPLAY DEVICE

CROSS-REFERENCE TO RELATED APPLICATIONS

This application claims priority under 35 U.S.C. 119 of Japanese Patent Application No. P2000-006073, filed Jan. 11, 2000 and Japanese Patent Application No. P2000-376914, filed Dec. 12, 2000, the entire contents of both of which are incorporated herein by reference.

BACKGROUND OF THE INVENTION

1. Field of the Invention

The present invention relates to a liquid crystal display device, a terminal device, or a portable terminal.

2. Discussion of the Background

Recent increases in the size of liquid crystal display devices have expanded their market as display devices for notebook personal computers, monitors, and so on.

In conventional TN type liquid crystal display devices, the contrast of displayed image was highly dependent on viewing angle. In fact, the display is visible from only certain angles. This problem, however, is being improved through measures such as the use of viewing angle compensation film. This makes it possible to provide liquid crystal display devices with the same range of viewing angles as CRTs.

In U.S. Pat. No. 5,666,178 or U.S. Pat. No. 5,652,634, methods for broadening the viewing angle are disclosed. In these methods, in one pixel is provided with a plurality of sections, each with a different pre-tilt angle direction. Additionally, in Japanese Patent JP-A-9-5766, a method is disclosed in which a section is provided with a different pre-tilt angle direction in one pixel. In these disclosed prior art methods, the section with different pre-tilt angle direction is provided in one pixel for the purpose of broadening the viewing angle. The ratio between the areas of the sections with different pre-tilt angle directions is unique for all pixels, that is, one display, in order to prevent uneven areas from occurring. Therefore, these methods neither disclose nor suggest a method of providing a specified image that is visible when the image is viewed from a specified direction.

In Japanese Patent JP-A-61-51124 and Japanese Patent JP-A-61-51125 a device having plural display areas is disclosed. In this device, liquid crystalline molecular orientation directions on the alignment films are different on a single substrate. The display patterns of this device are typically numerical. In this device, some of the numbers (display patterns) can be seen from one direction, and the others cannot be seen from the same direction. The applications of this device intend that at least one numeral on a display pattern can be seen from a direction.

On the other hand, conversely to the above, other displays are preferably only visible from the front (i.e., they do not permit oblique viewing). This prevents secret or confidential documents from being viewed by people other than the user of the display device while the documents are being prepared or read in a public place. For example, this allows the user of such a display to read or write a document such as a personal letter, regardless of the presence of people around the user. Herein, such a technology will be denoted as "viewing angle narrowing technology."

The viewing angle narrowing technologies that have been disclosed heretofore are a method of jointly using a liquid crystal display device having a liquid crystal layer for image display and a liquid crystal layer for phase difference control (JP-A-11-174489, JP-A-11-7045, JP-A-9-105958), a method of using a lens sheet (JP-A-11-84357 and others), a method of using a diffusing optical guide plate (JP-A-10-97199 and others), and so forth.

However, the above-described methods suffer from problems such as an increase in the number of parts and an insufficiently narrowed viewing angle.

SUMMARY OF THE INVENTION

Accordingly, it is an object of the present invention to provide a liquid crystal display device that displays a standard image when viewed from the front and a fixed image that is independent from an inputted image signal when viewed from another direction.

To that end, the present invention provides a liquid crystal display including a liquid crystal layer and alignment films sandwiching the liquid crystal layer, wherein surfaces of the alignment films are divided into a plurality of regions including a plurality of pixel units, and liquid crystal orientations on the alignment films in adjacent regions are different.

These regions may form a letter, or these regions may form, e.g., a visible figure.

A long side of a minimum hypothetical rectangle containing the region may be equal to or larger than 0.1 millimeter. The figure may be square.

A maximum voltage for driving the liquid crystal layer may be less than the saturation voltage of the liquid crystal layer. The maximum voltage for driving the liquid crystal layer Vm and the saturation voltage Vs have a following relation: $0.005 \text{ Vs} \leq \text{Vm} \leq 0.7 \text{ Vs}$.

The orientation in one of the regions may be unique. The orientation of the alignment films of the same color element in one of the regions may be unique.

According to a further aspect of the present invention, there is provided a liquid crystal display including a liquid crystal layer and alignment films sandwiching the liquid crystal layer, wherein surfaces of the alignment films are divided into a plurality of regions having different orientation directions, and a ratio of the regions in at least one pixel is different from a ratio of the regions in the other pixel.

The region may form a letter, or the region may form, e.g., a visible figure.

According to a further aspect of the present invention, there is provided a liquid crystal display including liquid crystal layer alignment films sandwiching the liquid crystal layer and a driving circuit for the liquid crystal layer, wherein an image formed by the driving circuit is displayed to a front direction and a fixed image independent of the driving circuit is displayed to oblique directions.

The alignment films may have a plurality of regions where orientations of the alignment films are different.

The fixed image may be a letter. The fixed image may be a visible figure. The fixed image may have a color.

According to a further aspect of the present invention, there is provided a liquid crystal display including liquid crystal layer alignment films sandwiching the liquid crystal layer and a driving circuit for the liquid crystal layer, wherein an image formed by the driving circuit is displayed to the normal direction of the liquid crystal layer and a fixed image independent of the driving circuit is displayed to a direction other than the normal direction.

According to a further aspect of the present invention, there is provided a liquid crystal display including a first liquid crystal layer displaying an image formed by a driving circuit, a second liquid crystal layer, and alignment films sandwiching the second liquid crystal layer wherein the alignment film has regions containing a visible figure, and orientations of adjacent regions are different.

According to a further aspect of the present invention, there is provided a liquid crystal display including a liquid crystal layer, a pair of substrates sandwiching the liquid crystal layer, and a driving circuit for the liquid crystal layer, wherein an image formed by the driving circuit is displayed to the front and a fixed image independent of the driving circuit is displayed to an oblique direction.

The substrate may be made of glass.

The driving circuit may be formed on the substrate, or the driving circuit may be formed separately from the substrate.

According to a further aspect of the present invention, there is provided a terminal device including a liquid crystal layer, a pair of substrates sandwiching the liquid crystal layer, and a driving circuit for the liquid crystal layer, wherein an image formed by the driving circuit is displayed to a front direction and a fixed image independent of the driving circuit is displayed to an oblique direction.

According to a further aspect of the present invention, there is provided a portable terminal device including a liquid crystal layer, a pair of substrates sandwiching the liquid crystal layer, and a driving circuit for the liquid crystal layer, wherein an image formed by the driving circuit is displayed to a front direction and a fixed image independent of the driving circuit is displayed to an oblique direction.

According to a further aspect of present invention, the alignment films in a liquid crystal display device are divided into a plurality of regions. In each of these regions, the orientation direction is different from at least some other regions so that they are viewed as dark colors (such as black) when seen from a specified direction. This variation in the liquid crystal display device that is dependent upon viewing angle is achieved by interfacial modification of the orientation direction performed on the alignment film.

Thus, some of the regions seen in a specified color from a specified direction prevent an image displayed on a screen from being seen from a certain direction.

Moreover, a fixed image can be viewed from a specified direction, independent of the display of an image signal inputted to the liquid crystal display device.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 9 is a table showing results of the measurement of viewing angle dependence of the liquid crystal display devices in the first to fourth embodiments and four comparative examples;

DETAILED DESCRIPTION OF THE PREFERRED EMBODIMENTS

Embodiments of the liquid crystal display device according to the present invention will be explained in detail in the following with reference to drawings. However, the present invention is not limited to the illustrated embodiments. In addition, numerical values (such as thickness) and materials are presented as only examples.

In the first embodiment of the present invention, an alignment film is divided into a plurality of square regions. In one square region, one orientation direction is given, while the orientation direction is different in an adjacent square region, so that plural orientation directions are periodically repeated over the arranged square regions.

Figure 1:
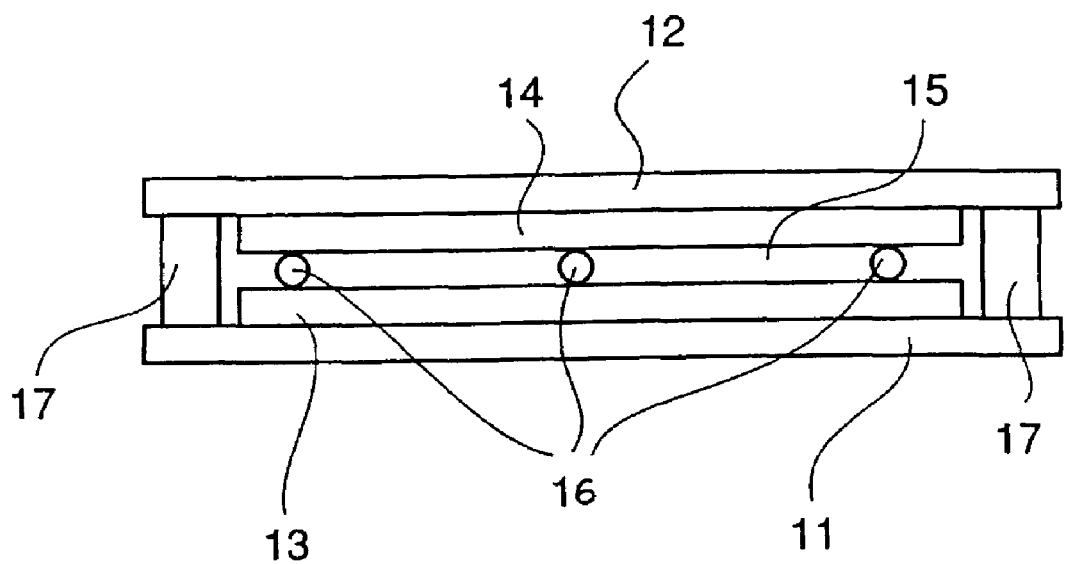
FIG. 1 is a cross-sectional view showing a first embodiment of an exemplary liquid crystal display device according to the present invention.

FIG. 1 is a cross-sectional view showing the first embodiment of a liquid crystal display device according to the present invention. The cross-sectional view is referred to for explaining a general structure of a liquid crystal display device. Thus, structures of the following embodiments are not limited to that shown in FIG. 1.

A polyimide alignment film 13 is provided on glass substrate 11 with Thin Film Transistors (TFT) formed thereon. On the other hand, a polyimide alignment film 14 is provided on a glass substrate 12 with color filters formed thereon. A liquid crystal material 15 is sealed between the glass substrate 11 and the glass substrate 12. The glass substrate 11 and the glass substrate 12 are separated by spacers 16 with a particle diameter of about 5 $\mu$m. Both ends of the glass substrates are sealed by an epoxy sealer 17. In this way, a liquid crystal display device with a uniform thickness is formed. Columns may be used between the substrates in order to maintain the separation between the glass substrates 11 and 12, instead of the spacer 16. In a small display, the separation may be maintained using only the sealer 17 provided at each end of the glass substrate.

Figure 18:
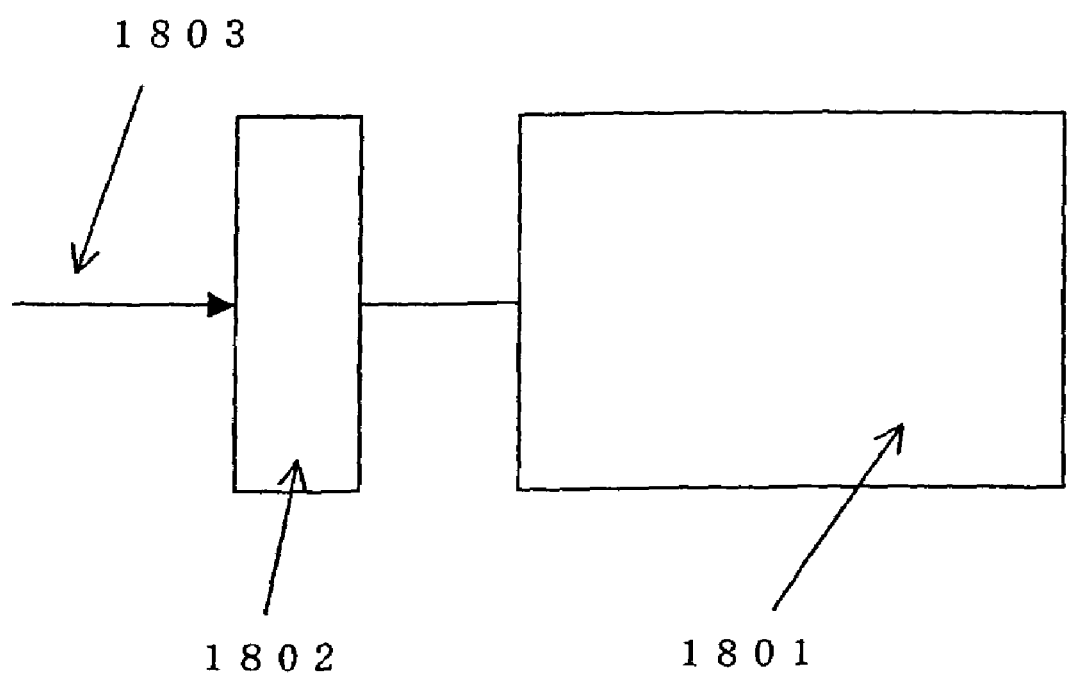
FIG. 18 is a schematic diagram of a typical liquid crystal display according to the present invention.

As shown in FIG. 18, in the liquid crystal display 1801, which has the liquid crystal layer held between the upper and lower substrates, a driving circuit 1802 is connected to the liquid crystal display 1801. The signal 1803 for determining the display on the liquid crystal display 1801 is input to the driving circuit 1801. The driving circuit 1802 may be formed on the upper or lower substrate, or it may be formed separately from the display 1801.

For the liquid crystal material, a TN type liquid crystal LIXON 5010 supplied by Chisso Petrochemical Co., Ltd. can be used which is used.

For the alignment film, a Polyimide P1-1051 supplied by Japan Synthetic Rubber Co., Ltd. can be used.

Figure 2:
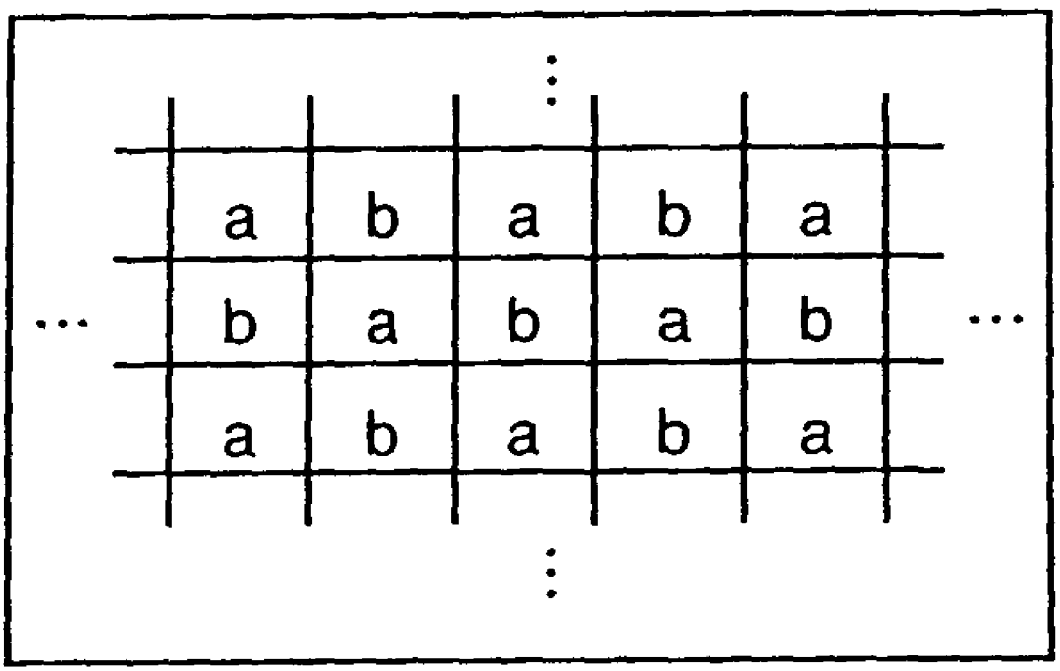
FIG. 2 is a plan view illustrating an arrangement of an exemplary region a and region b in each of which the liquid crystal orientation direction is different, shown in the first embodiment of the liquid crystal display device according to the present invention.

A plan view of the first embodiment of the liquid crystal display device according to the present invention is shown in FIG. 2. As used hereinafter, the expression "lower substrate" refers to the glass substrate 11 provided with the TFTs. The "upper substrate" refers to the glass substrate 12 provided with the color filters. The "upper substrate" and "lower substrate" designations are used for the sake of convenience only, and do not limit the location of either substrate in the present invention.

On the alignment film, an interfacial modification that relates to orientation is performed so that two kinds of regions, namely regions a and b as shown in FIG. 2, with different orientation directions that are alternately arranged. Here, the interfacial modification that relates to orientation is produced, e.g., by abrasion (e.g., rubbing, making minute grooves by lithography, etc.).

The display screen that is subdivided into two kinds of regions a and b is subject to the interfacial modification that relates to orientation. Each of the regions is formed into, for example, a square with sides of about 2.5 mm. This is sufficiently larger than the size of a pixel so that the regions can be directly recognized.

In this embodiment, the abrasion (e.g., rubbing) is performed as follows. First, a polyimide film is formed on the lower substrate, followed by uniform abrasion (e.g., rubbing) of the polyimide film. This first abrasion (e.g., rubbing) can be denoted as a forward abrasion (e.g., rubbing).

Figure 17:
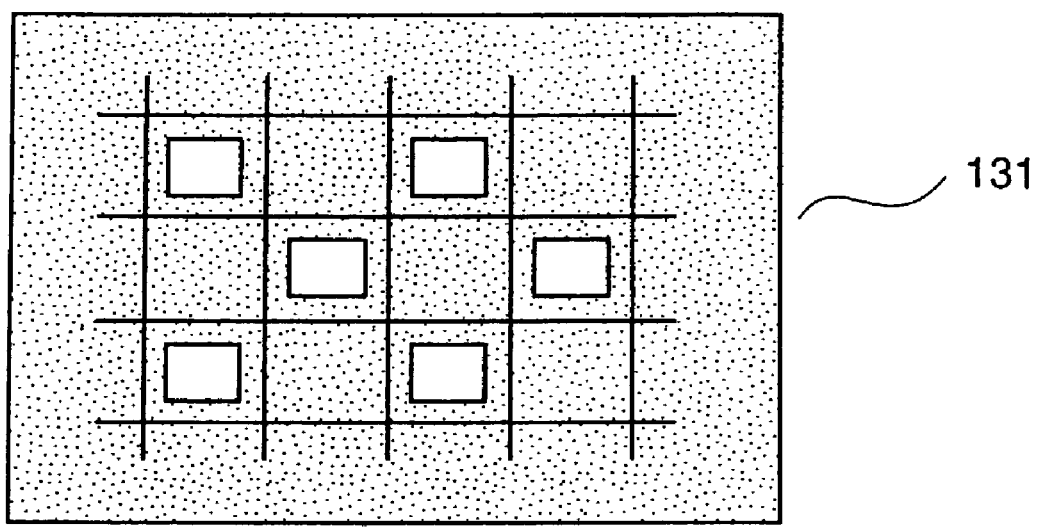
FIG. 17 shows an example of a photomask used in a step of changing the orientation state of the alignment film prepared as shown in FIG. 16 by light irradiation.

Next, either the regions a or the regions b are masked with a thin metal film made of, e.g., stainless steel, as shown in FIG. 17. In the illustrated example, the regions b are masked and abrasion (e.g., rubbing) is performed in the opposite direction to that of the original abrasion (e.g., rubbing). This second abrasion (e.g., rubbing) can be denoted as a reverse abrasion (e.g., rubbing). Next, the metal thin film is removed to provide a substrate as shown in FIG. 2.

Over the whole face of the upper substrate that faces the lower substrate, as shown in FIG. 2, a second polyimide film is formed in the same way that the first polyimide film was formed on the lower substrate. After formation, abrasion (e.g., rubbing) is performed on the whole face of the second polyimide film in an abrasion (e.g., rubbing) direction that is perpendicular to both abrasion (e.g., rubbing) directions of the lower substrate (provided both substrates are opposing). Then, regions corresponding to either regions a or regions b of the lower substrate are masked with a thin metal film made of, e.g., stainless steel. In the illustrated example, the regions b are masked, and abrasion (e.g., rubbing) is performed in a direction perpendicular to the forward and reverse directions of the abrasion (e.g., rubbing) performed on the lower substrate and opposite to the abrasion (e.g., rubbing) direction in the regions b of the upper substrate. The thin metal film is later removed.

Figure 3:
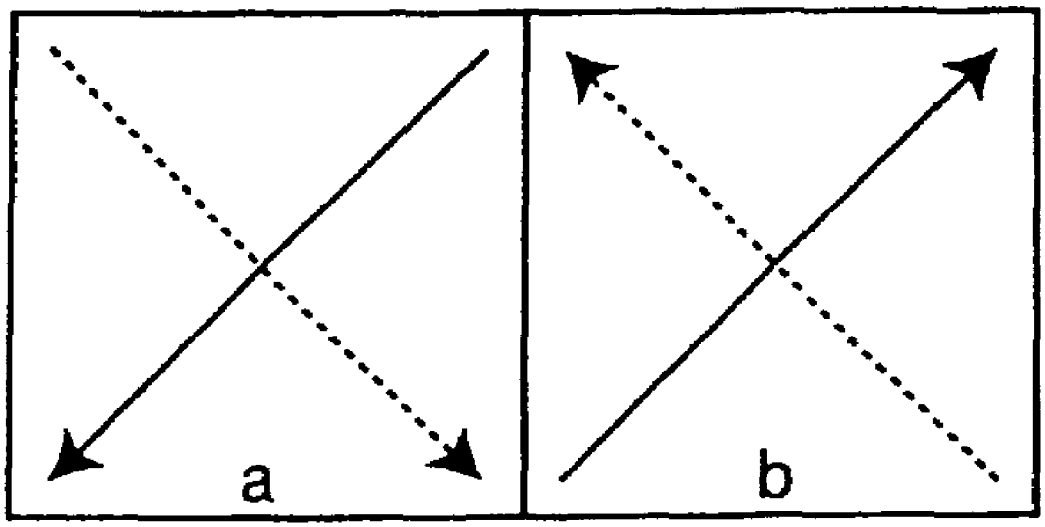
FIG. 3 is a sketch illustrating orientation directions of liquid crystals in the region a and the region b, with a solid line arrow showing an abrasion (e.g., rubbing) direction of a lower substrate and a dotted line arrow showing an abrasion (e.g., rubbing) direction of an upper substrate.

The resultant interfacial modification relating to orientation in the region a and the region b is illustrated by the directions indicated with solid lines arrows on the lower substrate, and dotted line arrows on the upper substrate in FIG. 3. The forward and reverse directions are opposite to each other in both region a and region b. Moreover, the upper and lower substrates are arranged so that the orientation direction on square regions of the upper substrate is perpendicular to the orientation direction on square regions faces of the lower substrate in each of the regions a and b.

In the illustrated embodiment of the liquid crystal display device, a sheet polarizer is provided on a surface of each of the upper and lower substrates. Here, polarization planes of the sheet polarizers on the upper and lower substrates are placed parallel to one another so that the display is seen as black when no voltage is applied. In addition, the sheet polarizers are arranged so that the polarization planes are parallel to the abrasion (e.g., rubbing) directions of either the region a or the region b. The maximum voltage applied when driving the display device was determined to be about 70% of the saturation voltage of the liquid crystal.

Figure 4:
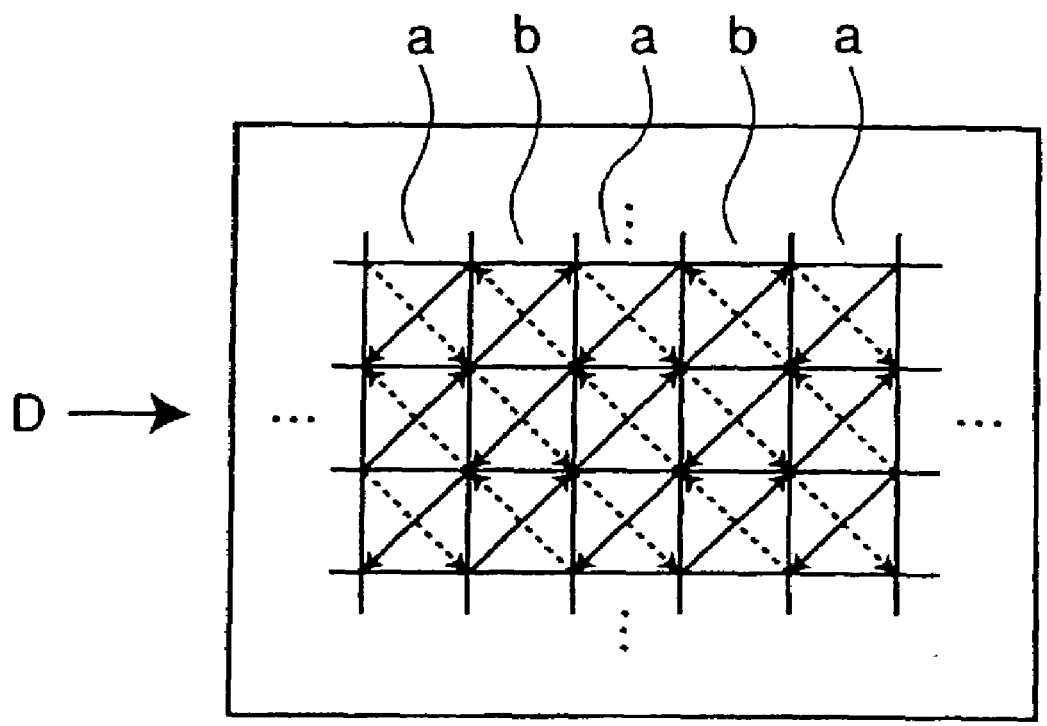
FIG. 4 is a sketch illustrating alignment treatment directions of an alignment layer in the liquid crystal display device, in which an arrow D represents an example of a viewing direction from which the region a appears black independent of the signal voltage into the liquid crystal layer, whereas the region b appears black from the direction opposite to the direction D.

With the above processing, the obtained substrate is shown in FIG. 4. In this type of liquid crystal display device, when obliquely viewed from the direction indicated by an arrow D, the regions a exhibit a strong dependence on the viewing angle and the display is substantially made invisible. Namely, the regions a are seen as black or blackened regardless of the display signal. On the other hand, when viewed from the direction opposite to that indicated by the arrow D, the regions b become transparent.

Figure 5:
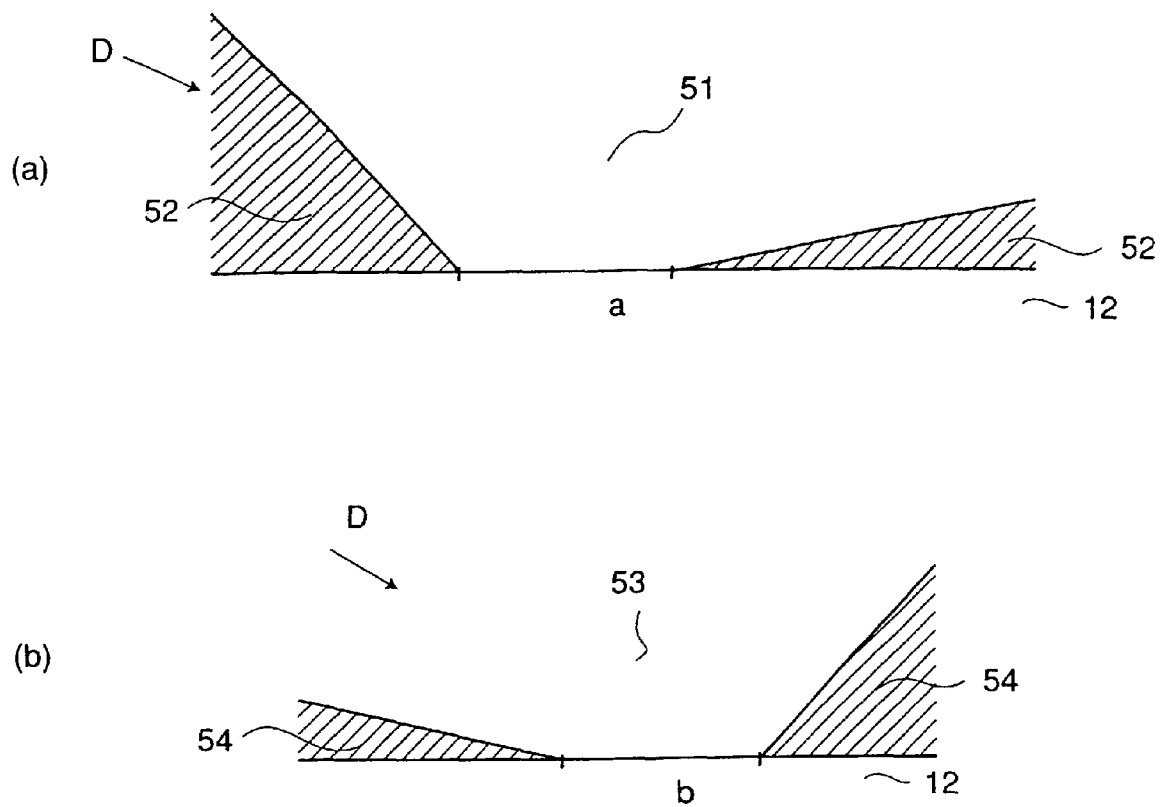
FIG. 5(a) is a conceptual cross-sectional view illustrating a region 51 in which an image displayed by the liquid crystal in the region a is visible (visible region) and regions 52 in which the image is invisible (invisible region) such that the region a is seen in black.
FIG. 5(b) is a conceptual cross-sectional view showing a visible region 53 of an image displayed by the liquid crystal in the region b and invisible regions 54 in which the region b is seen as black.

This will be further explained with reference to FIGS. 5(a) and 5(b), which are enlarged cross-sectional views of portions of the surface of the liquid crystal display device. Region a is shown in FIG. 5(a) and region b is shown in FIG. 5(b). Although the regions a and b are actually defined on the alignment film, for convenience in the illustrated embodiment, the regions a and b are conceptually shown directly on the glass substrate 12.

FIG. 5(a) illustrates an image visible region 51 and image invisible regions 52 for the region a. When the screen is viewed from the image visible region 51, the display reflects (e.g., displays) the condition of the liquid crystals (e.g., the image) as in a normal liquid crystal display device. On the other hand, when viewed from the image invisible regions 52, the display is always seen as black or blackened regardless of the condition of the liquid crystal. The state of being black or blackened is hereinafter expressed simply as "black." For example, the region a, when viewed from the direction D, is seen as black.

FIG. 5(b) shows an image visible region 53 and image invisible regions 54 for the region b. In the image visible region 53, an image displayed in the region b by the liquid crystals can be seen in the direction D. From the image invisible regions 54, however, the region b is seen as black.

Since the regions a and the regions b are arranged side by side, when the display is viewed from a certain direction (for example, from the direction D), a normal liquid crystal display can be seen in the regions b, while the regions a are seen as black. This prevents the whole image displayed on the liquid crystal display device from being seen.

Therefore, except for the case in which the display is viewed approximately from the front, it has been made difficult for an onlooker to understand any displayed information. Namely, from a direction other than the front, the black squares of the regions a or the regions b are seen on the display screen as if the displayed image were scrambled.

Figure 6:
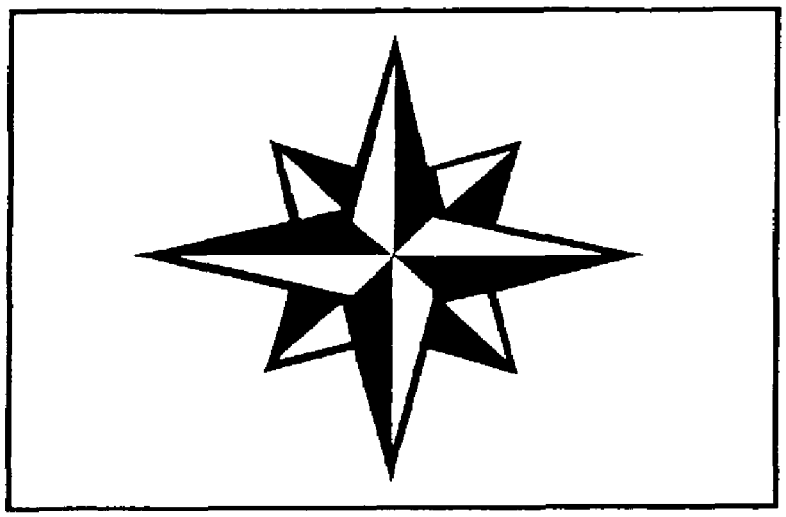
FIG. 6 is a sketch illustrating an example of an image displayed on the first embodiment of the liquid crystal display device when viewed from the front.
Figure 7:
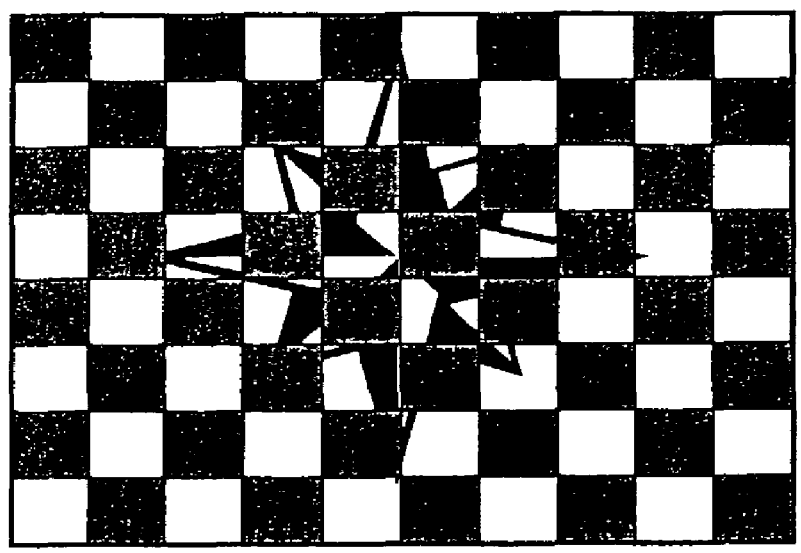
FIG. 7 shows the image presented in FIG. 6 when the liquid crystal display device is viewed from the direction indicated by the arrow D in FIG. 4, in which regions a appear black to make the indicated image difficult to view when the liquid crystal display device is seen from an oblique direction.

For example, consider an image displayed in the liquid crystal display device shown in FIG. 6. The image can be seen correctly from approximately the front of the display device, as shown in FIG. 6. However, when the display is viewed obliquely, (for example, from the direction D), the display contains scattered black patterns as shown in FIG. 7. This makes it impossible or difficult to resolve the displayed details.

Figure 8:
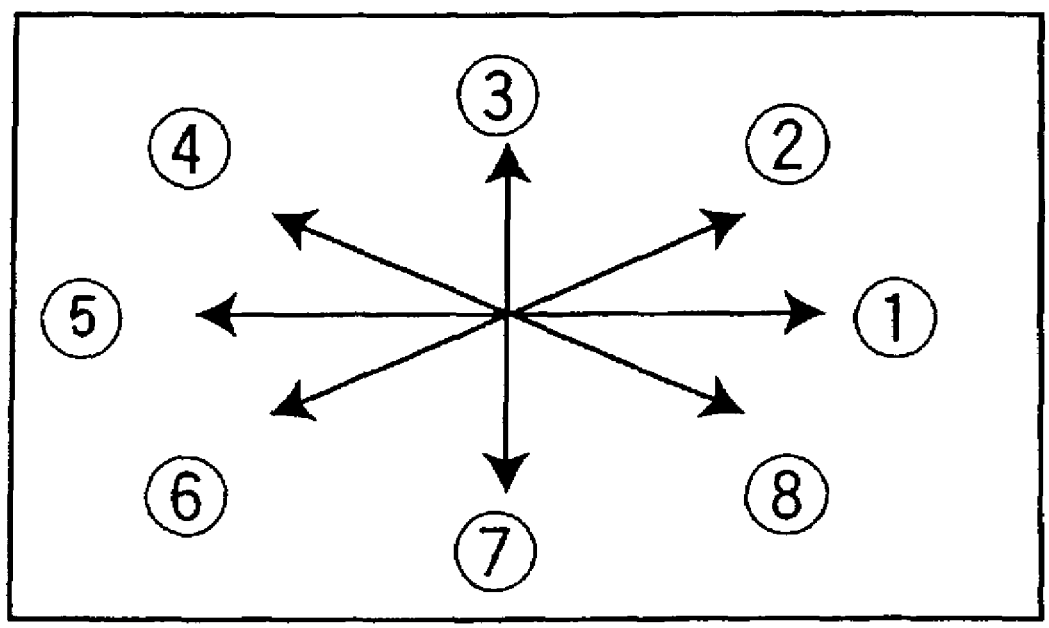
FIG. 8 is a sketch illustrating eight directions, 1 to 8, over which viewing angles are measured for exhibiting that the viewing angle depends on viewing direction.

In order to test the visibility of this embodiment of the liquid crystal display device, fifteen persons observed images and figures displayed in the liquid crystal display device from the directions numbered from 1 to 8 in FIG. 8. The images were characters (such as Chinese characters, hiragana characters, and alphabetic characters( and figures (such as photographs). In the test, the angles at which the displayed images were visible were determined and the results of a plurality of measurements were averaged. The angles at which the displayed images were visible are presented as inclination angles relative to a vector normal to the screen (that is, directly in front of the screen), which was taken as zero degrees. The measurements on characters and figures were performed separately.

The measurement results are presented in a table in FIG. 9, with the results from the first embodiment given in the first row of the table.

For the figures, in the directions 1 and 5, namely, in the horizontal direction, an inclination greater than about 16 degrees off the normal conceals the displayed figures.

In the directions 3 and 7, namely, in the vertical direction, inclinations up to about 32 degrees off the normal did not conceal the displayed figures. In the directions 2, 4, 6, and 8, which are intermediate to the above horizontal and vertical directions, inclinations up to about 18 degrees off the normal did not conceal the displayed figures.

For the characters, in the horizontal direction, the displayed characters were difficult to read from an inclination greater than about 15 degrees off the normal. In the vertical direction, the displayed characters readable from inclinations up to about 30 degrees.

The field of view that allows the characters to be read is slightly narrower than the field of view that allows the figures to be visible. It is believed that this is because the characters are finer and more complex than the figures. However, the difference between the characters and the figures is not very significant.

As is understood from the results of the test measurement, the liquid crystal display device provided with the regions a and b, as in the first embodiment, always allows a displayed image to be seen when viewed from the front. However, it is impossible to flawlessly view the displayed image from an inclination of 20 degrees or more off the normal when viewed obliquely from the right and left sides. This prevents the displayed image from being recognized when viewed from the side and permits the implementation of a liquid crystal display device in which only the user of the display can resolve the displayed image.

For example, the implementation of a mobile terminal or a cellular phone that can be operated on one's hand with a display screen that allows the user to see a displayed image and prevents other people from resolving the displayed image is possible.

When the display screen is viewed from directions other than the front, a pattern due to the orientation of the alignment film becomes visible irrespective of the displayed image. Therefore, it is favorable to suitably select the pattern depending on the purpose of the displayed image.

Figure 10:
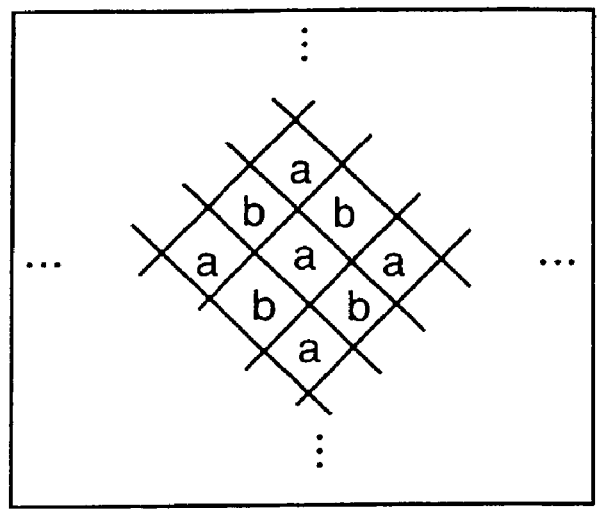
FIG. 10(a) is a plan view illustrating an arrangement of a region a and a region b, in each of which the direction of liquid crystal orientation is different from the other, in the second embodiment of the liquid crystal display device according to the present invention.
FIG. 10(b) is a view illustrating abrasion (e.g., rubbing) directions of the region a and the region b in FIG. 10(a), with a solid line arrow showing the abrasion (e.g., rubbing) direction of a lower substrate and a dotted line arrow showing the abrasion (e.g., rubbing) direction of an upper substrate.
Figure 10:
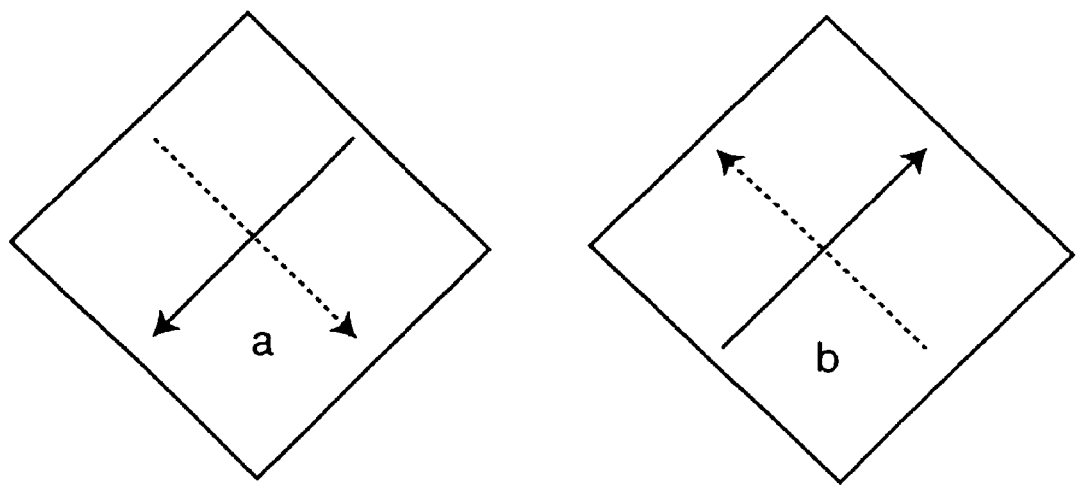

Although a normally black liquid crystal display, which displays black without the application voltage, is described above, a normally white liquid crystal which displays white without the application of voltage, can also be used. In normally white devices, it is preferable that a bias voltage of 0.5% to 70% of the saturation voltage of the liquid crystal be applied. It is more preferable that a bias voltage of 5% to 50% of the saturation voltage of the liquid crystal be applied. It is more preferable that a bias voltage of 5% to 20% of the saturation voltage of the liquid crystal be applied. In the second embodiment, the regions a and the regions b were arranged in a pattern shown in FIG. 10(a). In other respects, the second embodiment is the same as the first embodiment. In the second embodiment, the directions of diagonal abrasion (e.g., rubbing) of the regions a and the regions b matched to an image observer coming from the vertical direction. Although the pattern as shown in FIG. 10(a) is described as an embodiment, it is also possible to arrange the pattern such that the vertical direction of the pattern does not match the direction of the diagonal abrasion (e.g., rubbing) of the regions a and the regions b.

In a second embodiment of the present invention, the abrasion (e.g., rubbing) direction in the regions a and the regions b on the upper substrate are represented by dotted line arrows and those on the lower substrate are represented by solid line arrows. In the pattern in the second embodiment, the square regions are rotated relative to those in the first embodiment by 45 degrees. The regions a and the regions b are squares with sides of about 2.5 mm.

For the liquid crystal display device according to the second embodiment, a viewer's perception at different viewing angles was evaluated as in the first embodiment. The average values of thus obtained angles of inclination relative to the normal to the screen are shown in the table in FIG. 9. Approximately identical results to the first embodiment results were obtained, with smaller angles in the horizontal direction allowing the viewer to read a displayed image.

In a third embodiment of the present invention, a STN type liquid crystal ZLI-4540 (270 Degree Twist) supplied from Merck Japan Co., Ltd. was used for the liquid crystal material. Moreover, stripe-shaped ITO electrodes were provided on each of the upper and lower glass substrates. Here, the stripe-shaped ITO electrodes on the upper glass substrate were provided perpendicularly to those on the lower glass substrate when the two glass substrates are opposed. Other features such as the materials and conditions were identical to those in the second embodiment. The stripe-shaped ITO electrodes, each formed with a width of about 200 $\mu$m, were arranged at 20 $\mu$m intervals.

On the ITO electrodes provided on each of the upper and lower substrates, an alignment layer was formed which was abraded (e.g., rubbed) as in the second embodiment to form the regions a and b on the substrates.

The polarizing filters are aligned to be black when no voltage is applied, and the maximum voltage of the driving signals is 70% of the saturation voltage of the liquid crystal.

Upon application of a specified voltage to selected ITO electrodes on the upper and lower substrates, the molecular orientation of a liquid crystal at an intersection of the respective ITO electrodes is changed due to the influence of the electric field. This changes light transmittance of the liquid crystal, through which a desired image can be displayed.

In the third embodiment, a displayed image can be seen when the screen is viewed from the front, whereas, when viewed from the side, only either of the regions a or the regions b can be seen, thus making it impossible to observe the whole image.

The influence of viewing angle was evaluated in a liquid crystal display device made according to the third embodiment, in a manner similar to the manner in which the first embodiment was tested. The results are also shown in the table in FIG. 9.

In the third embodiment, it can be understood that the viewing angles in the horizontal direction for the displayed image are limited. The third embodiment makes it impossible to recognize the display image at an inclination about 25 degrees from the normal. In particular, when viewed from the directions 1 and 5, inclinations of 11 to 14 degrees from the front make it impossible to recognize the displayed image. In other words, by providing regions a and b, the viewing angle in the horizontal direction can be limited.

When a normally white liquid crystal display is used, it is preferable that a bias voltage of 0.5% to 70% of the saturation voltage of the liquid crystal be applied. It is more preferable that a bias voltage of 5% to 50% of the saturation voltage of the liquid crystal be applied. It is more preferable that a bias voltage of 5% to 20% of the saturation voltage of the liquid crystal be applied.

In a fourth embodiment according to the present invention, twisted FLC type ferroelectric liquid crystal 2005, supplied by Chisso Petrochemical Co., Ltd., was used as a liquid crystal material. This liquid crystal material exhibits a relatively high speed response. The thickness of the liquid crystal layer, i.e., the cell gap, is about 2 $\mu$m, and the maximum driving voltage is the saturation voltage of the liquid crystal. The polarization direction of the polarizing film is set parallel to the abrasion (e.g., rubbing) direction of the alignment layers on the substrates. In this case, the device is normally white. The viewing angles of this device are maximal when no voltage is applied. The other portions of a device according to the fourth embodiment are the same as those in the first embodiment.

In the liquid crystal display device according to the fourth embodiment, viewing angles were evaluated in a manner identical to the tests of the first embodiment. Averaged values of the obtained angles of inclination relative to the normal to the screen are shown in the table in FIG. 9.

In this embodiment, in the vertical direction (i.e., in the direction 3 and the direction 7), it is possible to resolve the displayed image even with an inclination 50 degrees off the normal. However, when viewed from the side (i.e., viewed from the direction 1 and the direction 5), an inclination of about 15 degrees off the normal makes it impossible to recognize the displayed image. In this embodiment, the effect of providing the regions a and b is remarkable.

Figure 11:
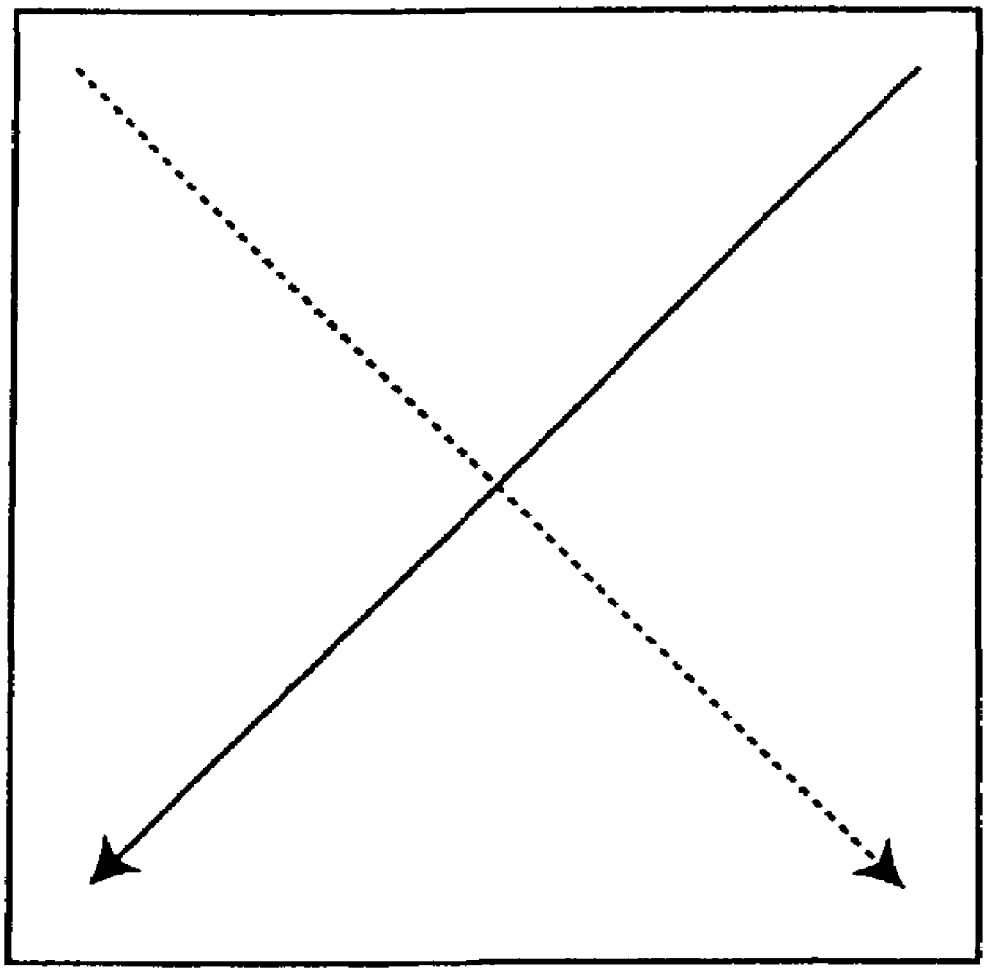
FIG. 11 is a plan view illustrating abrasion (e.g., rubbing) directions of substrates for liquid crystal display devices in comparative examples of liquid crystal display devices.

Comparative examples were prepared for demonstrating the effect of the present invention. Three kinds of liquid crystal display devices were prepared in which an interfacial modification related to orientation was performed on a display screen as shown in FIG. 11 without dividing the screen into a plurality of the regions with different orientation directions. Other portions of the three display devices were formed in the same way as the second, third, and fourth embodiments and are referred to as comparison examples 1, 2, and 3, respectively. Also, in each of the comparison examples, the abrasion (e.g., rubbing) direction on an upper substrate is represented by a dotted line arrow, and that on a lower substrate by a solid line arrow.

In the liquid crystal display device of the comparison examples, viewing angles were evaluated in the same manner as for the first embodiment. Averaged values of the obtained angles of inclination off the normal to the screen are shown in the table in FIG. 9.

In comparison example 1, when viewed from the direction 1, the image can be seen up to about 40 degrees inclined off the normal. However, when viewed from the opposite direction 5, an inclination of approximately 15 degrees off the normal conceals the image. Additionally, in the vertical direction, an inclination of about 30 degrees off the normal conceals the image. In this case, a displayed image is always visible from the front. From the direction 1, the displayed image can be seen over a wide range of inclination angles.

In the comparison example 2, when viewed from the direction 1, inclinations of 23 and 24 degrees off the normal conceal the image. From the direction 5, an inclination of about 10 degrees off the normal conceals the image. In the vertical direction, inclinations of several degrees above 20 degrees off the normal conceal the image. Also in this case, when viewed from the direction 1, the displayed image is visible over a wide range of angles.

In the comparison example 3, the image is visible from inclinations up to about 70 degrees off the normal from the direction 1. From the direction 5, an inclination of 20 degrees off the normal conceals the image. From the direction 1, the displayed image is visible over a wide range of angles.

Furthermore, by using the results shown in FIG. 9, a comparison was made across the display devices with TN liquid crystals by comparing the first and the second embodiments with the comparison example 1, a comparison across STN liquid crystals by comparing the third embodiment with the comparison example 2, and a comparison across twisted FLC liquid crystals by comparing the fourth embodiment with the comparison example 3.

In all of the display devices with the above types of the liquid crystal, it is shown that dramatically narrower viewing angles in the horizontal direction are provided by the present invention. Therefore, it has been proven that all of types of liquid crystal materials can be used to narrow the viewing angle according to the present invention. In particular, with the use of the twisted FLC liquid crystals that exhibit relatively high speed responses, a clearly moving image can be resolved when the image is viewed from the front.

In the above described embodiments, the interfacial modification related to orientation was performed in order to limit the viewing angle in the horizontal direction to achieve the results as presented in FIG. 9. Thus, by changing the orientation direction of the described embodiments, it is possible to limit the viewing angle in an arbitrary direction.

For comparison example 4, a liquid crystal display device like that of embodiment 1 with a saturation voltage of the liquid crystal layer supplied thereto was prepared. Viewing angles in this example were evaluated as in the first embodiment. Averaged values of the obtained angles of inclination off the normal to the screen are shown in the table in FIG. 9.

In the comparison example 4 is viewed from the side (namely from the direction 1 and the direction 5), an inclination about 25 degrees off the normal concealed the image. However, in the vertical direction, the image was visible from inclinations up to several degrees above 30 degrees off the normal, and little dependence on viewing direction was exhibited.

Comparison of the first embodiment with the comparison example 4 showed that when the maximum driving voltage was the saturation voltage of the liquid crystal layer, the viewing angle was broadened. Therefore, the maximum driving voltage is preferably taken as being equal to or below about 90% of the saturation voltage of the liquid crystal layer in normally black devices.

On the other hand, the maximum driving voltage must be at or above 40% of the saturation voltage of the liquid crystal layer. This is because a desirable image contrast cannot be obtained when the driving voltage is below about 40% of the saturation voltage.

When a normally white liquid crystal display is used, it is preferable that a bias voltage of about 0.5% to about 70% of the saturation voltage of the liquid crystal be applied. It is more preferable that a bias voltage of about 5% to about 50% of the saturation voltage of the liquid crystal be applied. It is more preferable that a bias voltage of about 5% to about 20% of the saturation voltage of the liquid crystal be applied.

Next, a fifth embodiment of the present invention will be described. In this embodiment, a liquid crystal display device like that in the first embodiment was used. However, it is possible to use liquid crystal display devices described in the second embodiment and later, or those with like functions.

In the above embodiments, when the display is viewed from directions other than the front, a pattern provided on the alignment film is observed regardless of the displayed image. This allows the display to provide a desired fixed pattern that is seen when the display is viewed from the side. Namely, by noting the fact that the fixed pattern (which has no relation to the displayed image) is seen from a direction other than from the front, a specified or predetermined figure can be made visible from this direction. In other words, instead of the typical checkered pattern shown in FIG. 7, a desired, fixed pattern can be displayed by suitably arranging the regions a and b when forming a desired orientation pattern on the alignment layer.

The fixed pattern can be formed so that, for example, a trade name of a product, a logo of a company, or a popular cartoon character can be seen when the display is viewed from the side. Such a liquid crystal display device can display a fixed pattern like a trade name of a product on a cellular phone that is presented to a prize winner.

Figure 12:
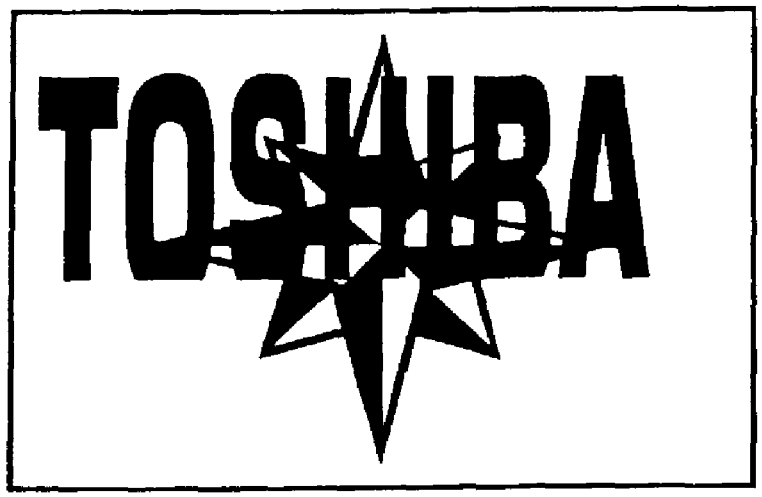
FIG. 12 is a view illustrating an example of a display of a logo such as a company name or a trade name of a product which is seen superimposed on the exemplary displayed image shown in FIG. 6 when the image is viewed from the side.

For example, when the liquid crystal display device is displaying the image shown in FIG. 6, this image displayed by the liquid crystal layer can be seen as superposed with patterns formed by regions with different orientation directions when the display is viewed from the side, as shown in FIG. 12. In this way, a permanent figure such as a company name or a trade name of a product can be displayed as a fixed pattern. Here, the fixed pattern such as the company name is displayed regardless of the display image of the liquid crystal layer and is independent of the input signal to the liquid crystal layer.

Figure 13:
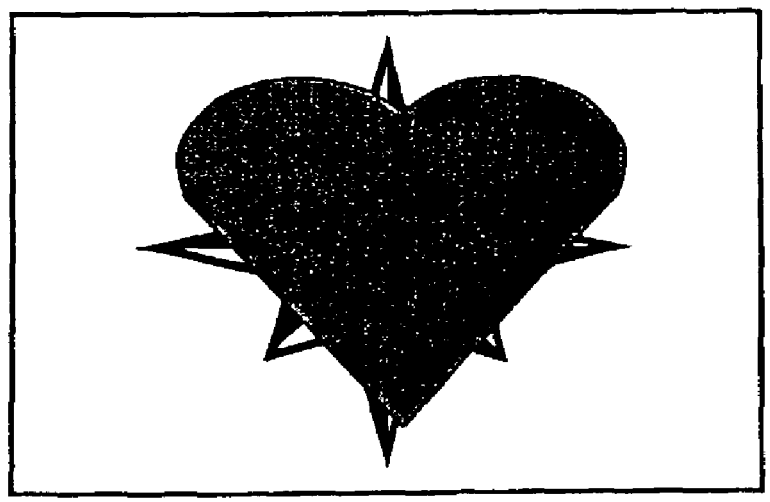
FIG. 13 is an illustration of an example of a display of a figure superimposed on the exemplary displayed image shown in FIG. 6 when the image is viewed from the side.

In addition, another example of a region with a different orientation direction is shown in FIG. 13, in which a heart shape is used. When the alignment film is divided into two regions a and b with such a single figure occupying a large portion of the display, the figure is seen, as shown in FIG. 13 for example, when laterally viewed from the right. Conversely, when laterally viewed from the left, the display is seen with a figure displayed in the liquid crystal layer being within the heart-shaped pattern whose outside is seen as black. Instead of the heart-shaped pattern in the example, any desired pattern can be formed as the fixed pattern.

A single fixed pattern that is large compared to the size of the display screen is effectively used as a message. However, the prevention of viewing the display from the side is hindered. Conversely, a fine pattern is effective when used for preventing the display from being examined, but transmits a message less effectively. In this regard, prevention of the examination of the display from the side and providing a message are incompatible. However, since the fixed pattern can be designed as desired, it can be selected in light of the above incompatible effects.

The fixed pattern can be prepared by designing regions having changed orientation directions. Therefore, no the manufacturing process of the normal liquid crystal display device is not significantly changed. Furthermore, a pattern used to form the regions in which the orientation direction are made different can be so easily prepared that there is relatively little time lost in the manufacturing process.

In a sixth embodiment according to the present invention, a liquid crystal display like that in the first embodiment can be used. Moreover, it is possible to make liquid crystal display devices described in the second embodiment and later or other liquid crystal display devices which can provide color displays using the sixth embodiment.

Figure 14:
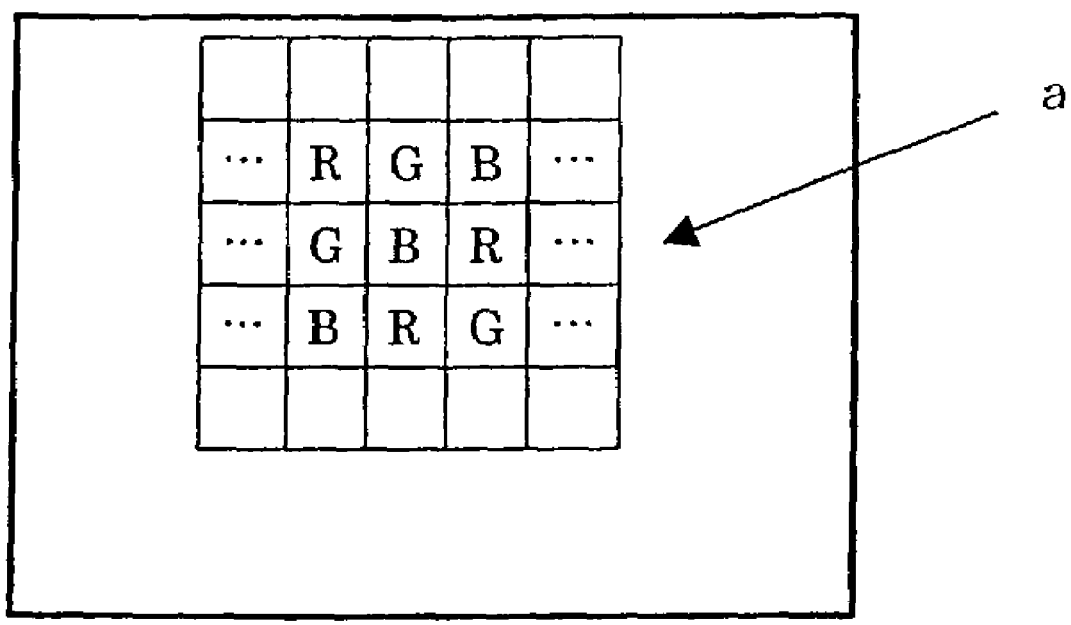
FIG. 14 is an illustration of the region a in which red, green, and blue pixels of a color liquid crystal display device are arranged.

FIG. 14 is a view shows an example liquid crystal display device that displays a color image. On the display, pixels displaying red (R), green (G) and blue (B) are arranged. The arrangement of the R, G and B pixels is not necessarily limited to that shown in FIG. 14.

Here, as in the first embodiment, the alignment layer is divided into regions a and regions b. Each of the divided regions must be divided so as to include a plurality of pixels and be visible as a region. For example, when the alignment layer is divided into the regions a or b shown in FIG. 2, each of the regions a and regions b has a size that includes a plurality of pixels. Therefore, it should be noted that the region a includes a plurality of R, G and B pixels, as shown in FIG. 14. The same is true about the region b.

The following explanation will be made in the context of region a. However, the same is true for region b.

For example, only the orientation direction of the pixel R in the region a is different from that of the pixels G and B. This can be made, for example, by reversing the abrasion (e.g., rubbing) direction in the pixel R relative to that of the pixel G and pixel B shown in FIG. 15.

Figure 15:
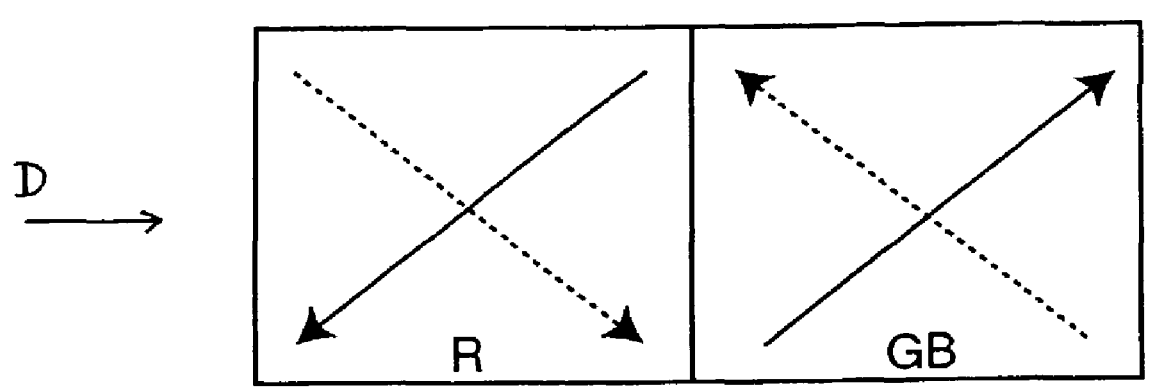
FIG. 15 is an illustration of that the orientation direction of the liquid crystals in a pixel R is different from those of pixels G and B.

Such a implementation allows the region a to be seen in bluish green when viewed from, for example, the direction D shown in FIG. 15, and in red when viewed from the side opposite to D. That is, by selectively changing the orientation direction only of pixels of a specified color in the region a, it becomes possible for the region a to be seen as colored when viewed from the side.

As explained above, when the region a is colored and formed in a desired pattern (as in the fifth embodiment), it is possible to provide a fixed colored image that is visible when viewed from the side.

Figure 19:
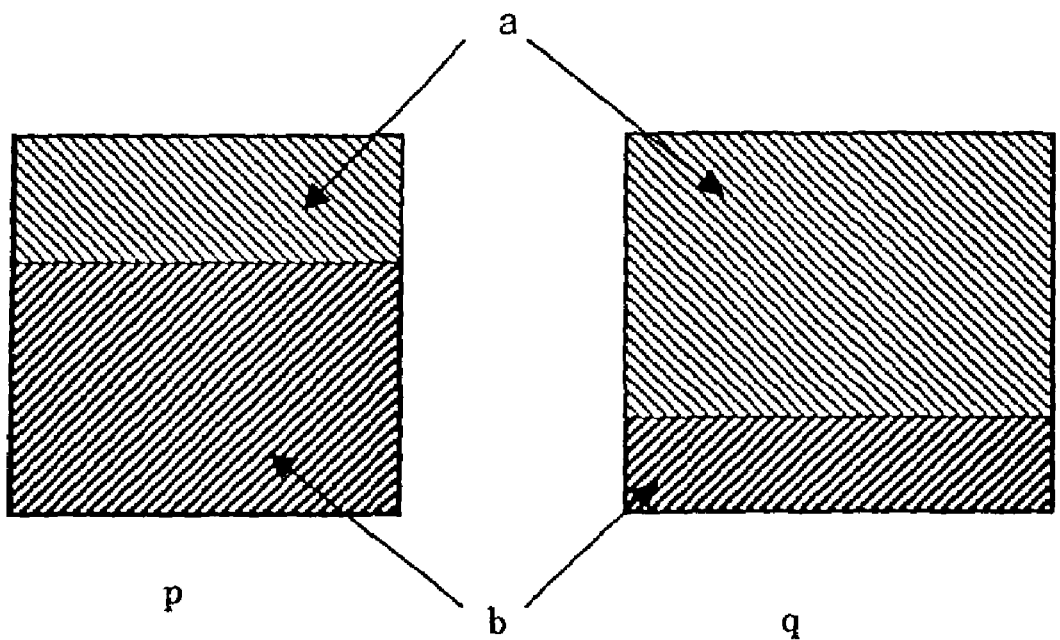
FIG. 19 shows two pixels in the display which have different ratios between the region a and region b.

Any desired tint can be displayed depending on the selection of pixels R, G and B in the regions a. For example, when the region is defined by pixel units, the fixed patterns can be expressed in eight colors from a viewing direction. When a pixel is subdivided by the regions as shown in FIG. 19, the fixed patterns can be expressed in any intensity level or color (as in a photo). In FIG. 19, pixels p and q in the display are divided into two regions a and b. The ratio of the areas of regions a and b in the pixel p is different from that of pixel b. The pixels thus have different ratios of the areas of the regions, which in turn have different orientation directions. This unevenness in the display is made intentionally and is used to display fixed figures.

Thus, according to the sixth example, it is possible to color a desired fixed pattern.

The above embodiment was explained as an example of using the mask abrasion (e.g., rubbing) method for forming the regions a and b. This method includes physically shielding regions other than the region to be subjected to abrasion (e.g., rubbing). In addition to the above method, a part of the alignment layer with light after abrasion (e.g., rubbing) can be irradiated to form a plurality of regions with different orientation directions. The irradiation changes the pre-tilt angle of the alignment layer to form an irradiated part with a different viewing angle dependence.

The method of changing pre-tilt angle by light irradiation will be explained with reference to FIG. 16 and FIG. 17.

Figure 16:
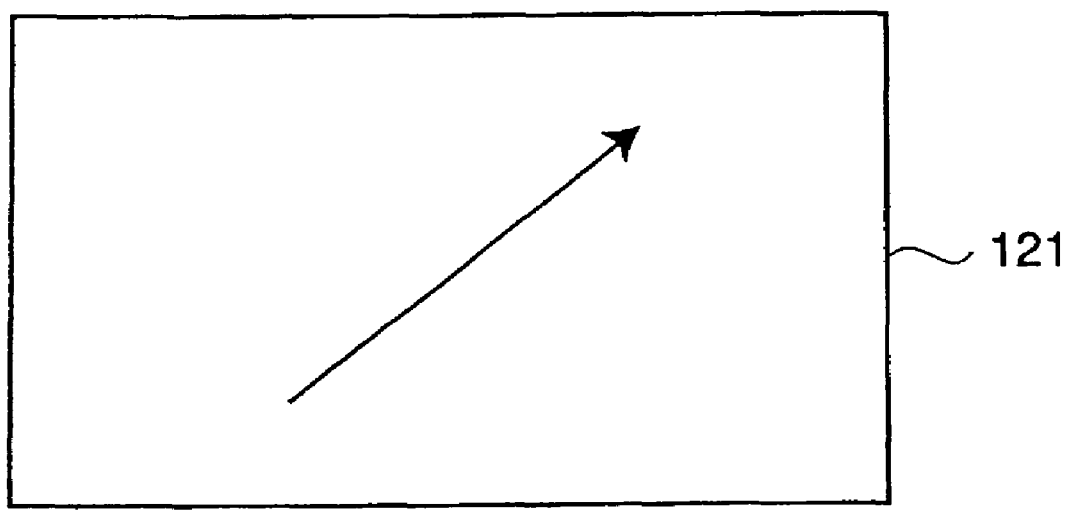
FIG. 16 illustrates an alignment film with uniform abrasion (e.g., rubbing) applied thereto as a first step in a method of forming regions with different orientation directions of liquid crystals in the alignment film.

First, on a glass substrate 121, a polyimide film is formed, the whole surface of which is then subjected to abrasion (e.g., rubbing) in a specified orientation direction (in the direction indicated by the arrow, for example) as shown in FIG. 16.

Along with this, a photomask 131 is prepared which has a pattern as shown in FIG. 17.

With the photomask 131 set on the glass substrate 121 with the polyimide film, irradiation with visible-ultraviolet rays is performed on the glass substrate 121 from a high pressure mercury lamp of about 10 J/cm$^2$. The ultraviolet ray irradiation reduces pre-tilt angle of the alignment layer in the region irradiated by the ultraviolet rays.

On a glass substrate that is to face the glass substrate 121, a polyimide film is similarly formed and subjected to abrasion (e.g., rubbing). On this glass substrate that is to face the glass substrate 121, a photomask which has a reversed pattern to that of the photomask 131 shown in FIG. 17 is set and a similar ultraviolet ray irradiation is performed. The two glass substrates are then arranged so that the irradiated parts of one substrate oppose the unirradiated parts of the other substrate.

Following this, nematic liquid crystal material is injected to form a liquid crystal display device between the glass substrates.

When a dextrorotary structure is stable at regions where only abrasion (e.g., rubbing) has been performed, levorotary liquid crystals are used. Conversely, when a levorotary structure is stable at regions where only abrasion (e.g., rubbing) has been performed, dextrorotary liquid crystals are injected. This makes it possible to form two regions that exhibit a strong dependence on viewing angle different from one another.

For example, when forming regions with a plurality of orientation directions, two or more orientation directions can be sufficient. Two orientation directions make it difficult to recognize the display from any direction other than from the intended direction.

An example embodiment is described in which a region seen as black when viewed from the direction 1 shown in FIG. 8 and a region seen as black when viewed from the direction 5 are alternately arranged. However, the arrangement of regions is not necessarily alternating. Namely, it is possible to simultaneously arrange on the screen a region seen as black when viewed from the direction 1, a region seen as black when viewed from the direction 5, and a region in which a displayed image can be seen when viewed from the direction 1 and the direction 5.

In addition, shapes and sizes of the regions with different directions of orientation can be selected as desired, considering the purpose, design, etc. of the display. For example, a region can be formed in the shape of a polygon such as a parallelogram or a triangle, circle, or ellipse. The size of the region can be also changed depending on the purpose. For example, when a minimum quadrilateral considered as including the region has a length between about 0.1 mm and about 1 cm, the display screen is favorably made unrecognizable from a direction other than from the front. Furthermore, it is preferable that the length of the quadrilateral be between about 0.5 mm and about 5 mm.

With respect to a sheet polarizer of the liquid crystal display device, it is arranged so that it provides either a black display or a white display when no voltage is applied.

When narrowing the viewing angle according to the present invention, it is preferable to drive the display with a voltage equal to or below the saturation voltage of the liquid crystal layer. Thus, it is better to set the liquid crystal display device to provide a black display when no voltage is applied. This allows the liquid crystal display device to present a sufficiently black display yet provide a good image quality.

When a normally white liquid crystal display is used, it is preferable that a bias voltage of about 0.5% to about 70% of the saturation voltage of the liquid crystal is applied to obtain an effective display. It is more preferable that a bias voltage of about 5% to about 50% of the saturation voltage of the liquid crystal is applied. It is more preferable that a bias voltage of about 5% to about 20% of the saturation voltage of the liquid crystal is applied.

Although the liquid crystal layer is sandwiched between the substrates in the above described examples, a liquid crystal display with a liquid crystal layer formed on a single substrate can be produced. In this type of display, the liquid crystal layer is sandwiched between the substrate and a protective film instead of a substrate.

Furthermore, the liquid crystal display device according to the present invention can be made to have two liquid crystal layers. Here, a liquid crystal layer on the far side of the user is to be denoted as a lower liquid crystal layer, and that on the near side is denoted as an upper liquid crystal layer. The lower liquid crystal layer is to display a display image as usual. The upper liquid crystal layer is made to have a plurality of regions with different orientation directions with adjacent regions arranged so that the orientation directions are different from one another. This makes the upper liquid crystal layer display a specified figure when viewed from directions other than from the front.

With the upper liquid crystal layer in an intermediate displaying state, an image displayed in the lower liquid crystal layer can be seen from the front. However, when the display is viewed from directions other than from the front, the image displayed in the lower liquid crystal layer is screened by the figure displayed in the upper liquid crystal layer.

Moreover, when a voltage is applied to the upper liquid crystal layer to orient the liquid crystal molecules therein, the display is made uniform to allow a displayed image in the lower liquid crystal layer to be visible even when viewed from directions other than from the front. That is, this allows a switching operation that conceals or reveals the displayed image in the lower crystal layer from directions other than from the front.

Figure 20:
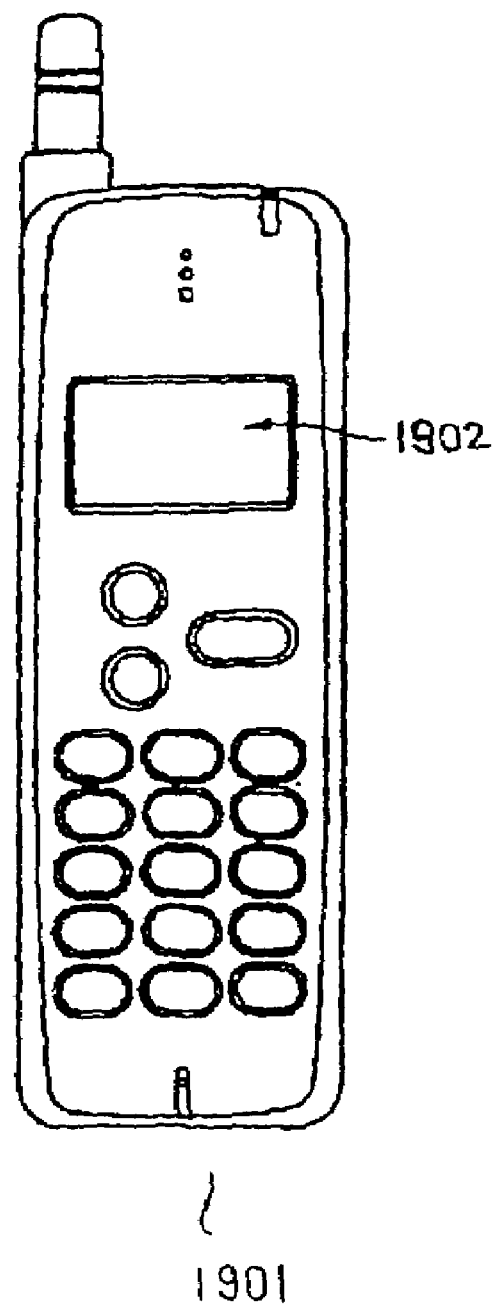
FIG. 20 shows an example of a cellular phone using an exemplary liquid crystal display according to the present invention.
Figure 21:
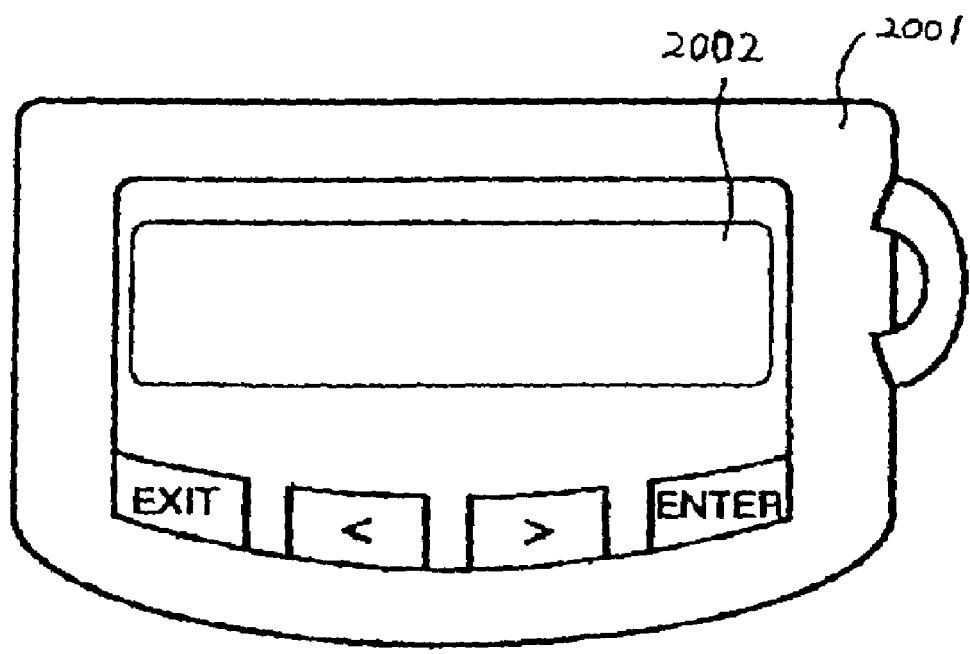
FIG. 21 shows an example of a palmtop computer using an exemplary liquid crystal display according to the present invention.

The liquid crystal display can be used in cellular phones, portable terminals, palm computers, laptop computers, and other devices. For example, as shown in FIG. 20 or FIG. 21, the above-described liquid crystal displays can be used to form the display 1902 of the cellular phone 1901, or the display 2002 of the palmtop computer 2001.

As described above in detail, the liquid crystal display device according to the present invention makes a fixed pattern visible which has no relation with an image displayed on the screen when viewed from directions other than from the front. This can make it difficult to recognize displayed information and makes it possible to prevent the displayed information from being surreptitiously observed by other persons. Furthermore, the fixed pattern can be used for displaying a background figure or a trade name of a product. Moreover, a new location for advertisements on a liquid crystal display has been found.

Obviously, numerous modifications and variations of the present invention are possible in light of the above teachings. It is therefore to be understood that within the scope of the appended claims, the invention may be practiced otherwise than as specifically described herein.

What is claimed is:

1. A terminal device comprising:
   a liquid crystal layer;
   a driving circuit configured to drive said liquid crystal layer; and
   alignment layers sandwiching said liquid crystal layer, comprising a plurality of regions having different orientations, at least one of said plurality of regions being configured to display a fixed image,
   wherein an image formed in said liquid crystal layer by said driving circuit is displayed at a front direction and said fixed image independent of said driving circuit is not displayed in the front direction and is displayed at an oblique direction, and said image formed by said driving circuit and said fixed image are formed to be directly overlapped upon one another.

2. A terminal device according to claim 1, wherein said fixed image comprises a letter.

3. A terminal device according to claim 1, wherein said fixed image comprises a visible figure.

4. A terminal device according to claim 1, wherein said fixed image comprises a logo.

5. A terminal device according to claim 1, wherein said fixed image comprises squares.

6. A terminal device according to claim 1, wherein said fixed image comprises a color.

7. A terminal device according to claim 1, wherein a long side of a minimum hypothetical rectangular containing one of said plurality of regions is equal to or larger than 0.1 millimeters.

* * * * *

UNITED STATES PATENT AND TRADEMARK OFFICE
CERTIFICATE OF CORRECTION

PATENT NO. : 6,989,880 B2
APPLICATION NO. : 10/194014
DATED : January 24, 2006
INVENTOR(S) : Kohki Takato et al.

It is certified that error appears in the above-identified patent and that said Letters Patent is hereby corrected as shown below:

On Title Page, Col. 1 before (21), please insert the following:

--This patent is subject to a terminal disclaimer.--

Signed and Sealed this

Twenty-first Day of November, 2006

JON W. DUDAS
*Director of the United States Patent and Trademark Office*